US006013150A

United States Patent [19]

Willis

[11] Patent Number: 6,013,150

[45] Date of Patent: Jan. 11, 2000

[54] ARTICLE TAGGING APPARATUS AND METHOD

[75] Inventor: Ronnie M. Willis, Jackson, Tenn.

[73] Assignee: Grinnell Corporation, Exeter, N.H.

[21] Appl. No.: 08/982,695

[22] Filed: Dec. 2, 1997

[51] Int. Cl.[7] .............................. B32B 31/00; B32B 35/00

[52] U.S. Cl. .......................... 156/212; 156/362; 156/458; 156/483; 156/484; 156/485

[58] Field of Search ..................................... 156/447, 458, 156/475, 483, 484, 485, 542, DIG. 6, DIG. 7, DIG. 25, DIG. 26, DIG. 27, DIG. 38, 362, 363, 212

[56] References Cited

U.S. PATENT DOCUMENTS

| | | | |
|---|---|---|---|
| 1,230,550 | 6/1917 | Woodland . | |
| 1,338,793 | 5/1920 | Schou . | |
| 2,367,189 | 1/1945 | Avery . | |
| 2,639,830 | 5/1953 | Weimont . | |
| 2,657,816 | 11/1953 | Everett . | |
| 3,064,714 | 11/1962 | Flood . | |
| 4,473,429 | 9/1984 | Crankshaw | 156/483 |
| 4,665,679 | 5/1987 | Watanabe | 156/483 X |
| 5,021,116 | 6/1991 | Milgram, Jr. et al. . | |
| 5,022,954 | 6/1991 | Plaessmann | 156/542 |
| 5,250,129 | 10/1993 | Twele | 156/542 X |
| 5,350,482 | 9/1994 | Westbury . | |
| 5,437,759 | 8/1995 | Westbury . | |
| 5,480,502 | 1/1996 | Rello et al. . | |
| 5,705,024 | 1/1998 | Bainbridge et al. | 156/475 |

*Primary Examiner*—Curtis Mayes
*Attorney, Agent, or Firm*—W. Warren Taltavull; Farkas & Manelli PLLC

[57] ABSTRACT

A tag applicator for cylindrical objects is provided with an applicator station for receiving an adhesive surfaced label or tag over a pair of flexible wrapping fingers; a transport device engages, grips and moves an article to be tagged from a supply station through a tag applying station and then to a discharge station with the movement of the part through the tag applying station being effective in combination with the wrapping fingers to securely apply the adhesive tag to the part.

16 Claims, 2 Drawing Sheets

ARTICLE TAGGING APPARATUS AND METHOD

FIELD OF THE INVENTION

The present invention relates to the application of a tag to a body and in particular to a cylindrical object such as a pipe nipple or similarly shaped part.

BACKGROUND OF THE INVENTION

In many systems which are constructed from multiple parts, manufacturers have been faced with the task of individually labeling each part both for inventory control and for assembly purposes as well as other purposes.

The application of individual labels or tags to an article that is to be assembled into a larger system, such as an electrical or fluid distribution system, has been both a time consuming and expensive operation. Attempts have been made in the prior art to mechanize the labeling operation and, with the introduction of computer controls, improvements have become available which have facilitated the accurate labeling of parts of a complex system. However, in connection with some industrial parts, particularly in water and gas distribution systems such as those employed in sprinkler systems, the development of cost effective and accurate labeling of the individual elements which are generally of cylindrical shape, has not been widely effective because of the lack of accurate control of the labeling process as well as due to the relatively slow throughput speed of the labeling mechanisms.

In addition, the control of the labeling mechanism has required frequent and lengthy downtimes to allow adjustment of the dispensing of labels to an application site or has required that the articles being labeled all be of uniform size and shape. In many applications, any deviation from a fairly rigid standard size could not be tolerated efficiently by the available mechanisms.

SUMMARY OF THE INVENTION

The present invention overcomes the foregoing difficulties by providing a labeling tag applying apparatus and method which will automatically label an individual body with an individual tag as that body is moved from a supply for the bodies to a discharge station. With the arrangement of the present invention, the transport mechanism is substantially simplified where the individual articles will be transported through a tag applying station which will in itself effect application of an adhesively coated tag to the individual article in a secure and accurate manner. Variations in the size and shape of the articles to be tagged can be readily tolerated at minimum downtime and cost.

The foregoing advantages of the present invention as well as others will become apparent as consideration is given to the following detailed description and accompanying figures in which:

DETAILED DESCRIPTION OF THE INVENTION

Figure 1:
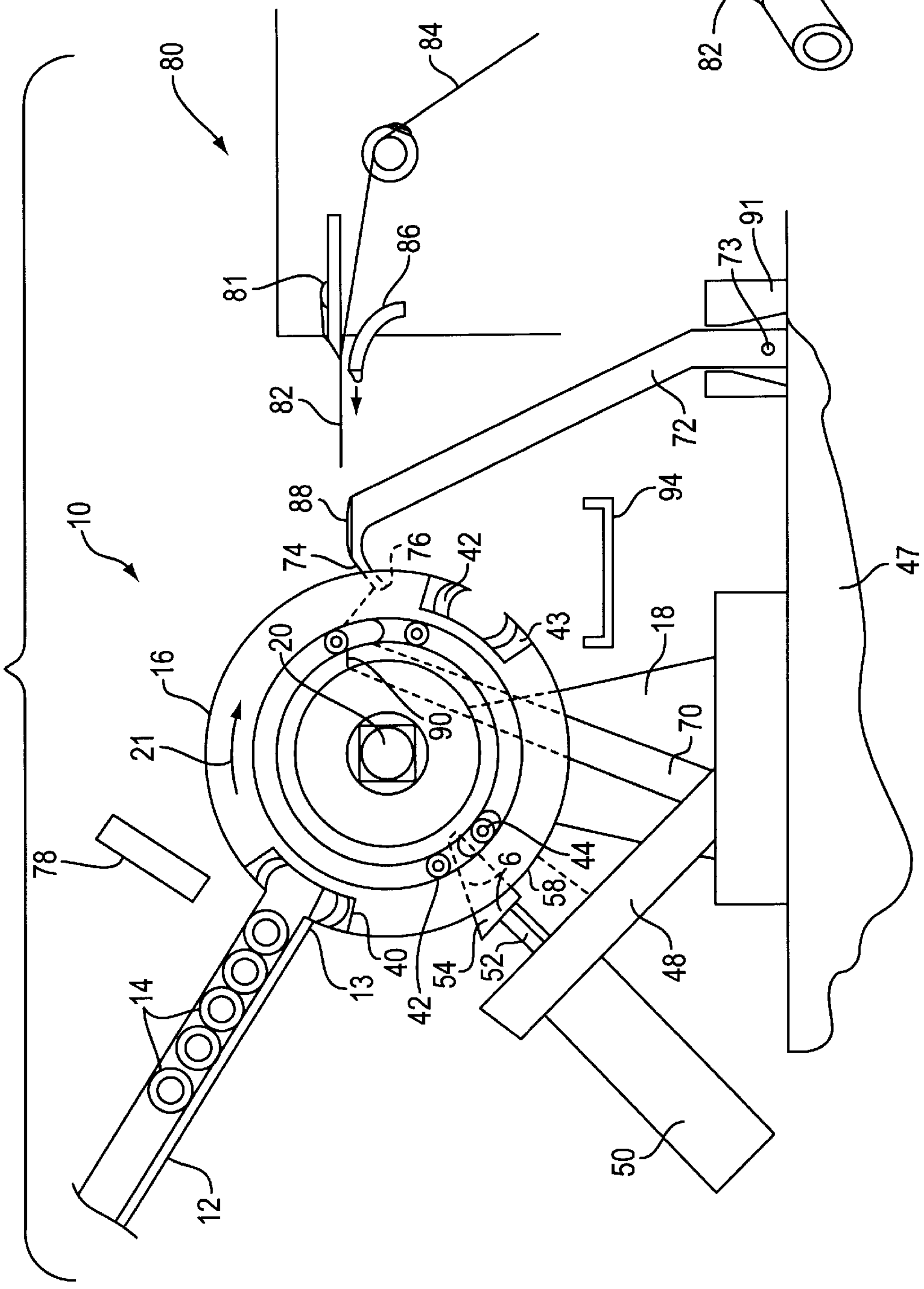
FIG. 1 is a schematic side view of the apparatus of the present invention.

Referring to the figures, where like numerals designate corresponding parts throughout the several views, there is shown in FIG. 1 generally at 10, the apparatus of the present invention. As illustrated, the present invention includes a sloping supply tray 12 in which cylindrical objects such as pipe nipples 14 are placed to be fed under the influence of gravity to a discharge end 13 located adjacent a transport apparatus in the form of a plurality of discs one of which is shown at 16. The discs 16 as well as the other discs, as described below, are mounted on a shaft 20 which is rotated in the direction of the arrow 21 on a support leg a portion of which is shown in 18.

Figure 2:
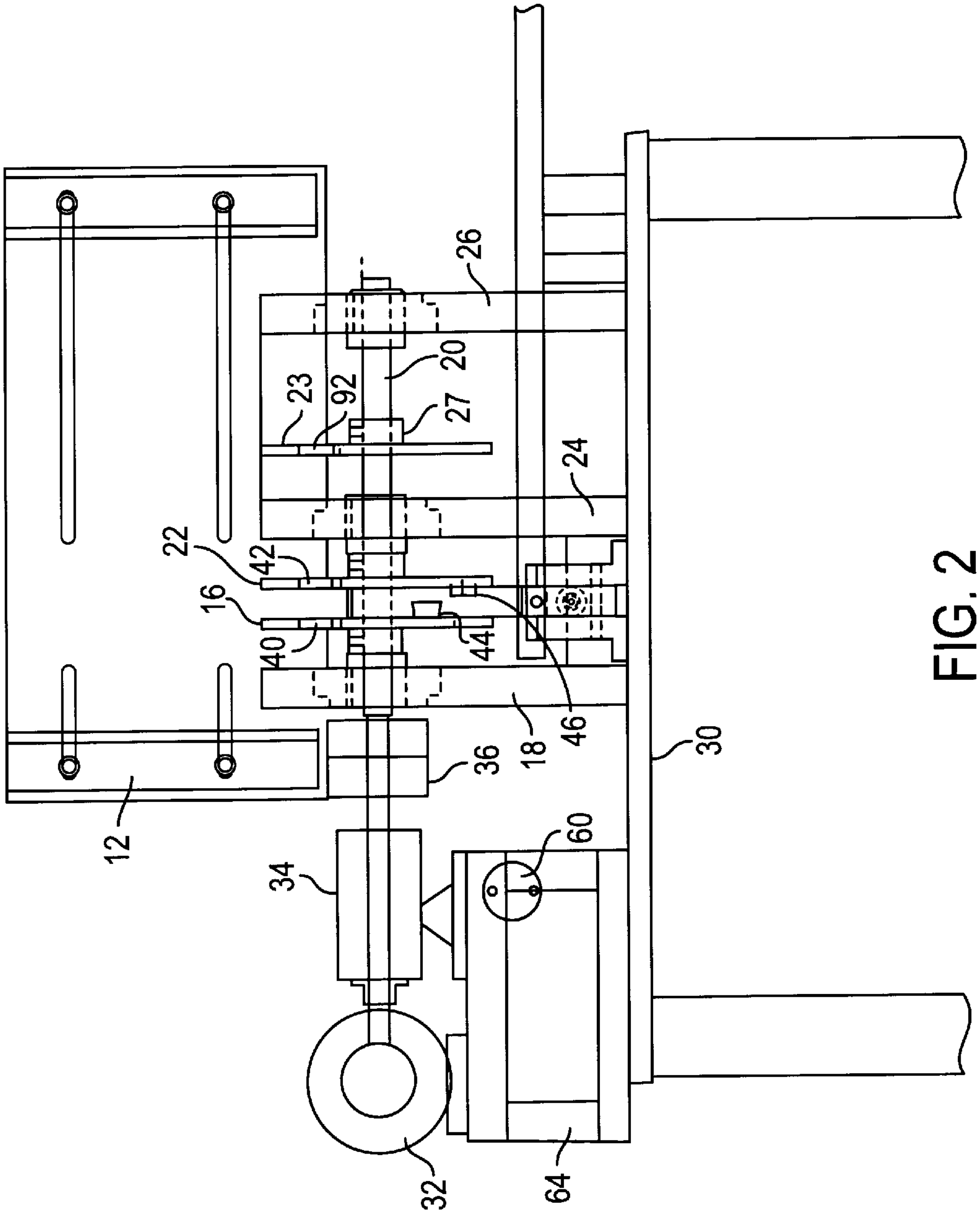
FIG. 2 is a front view in elevation partially in section of the apparatus of the present invention with the tag dispensing device removed.

Referring to FIG. 2, it will be seen that a plurality of support legs 18, 24 and 26 may be provided spaced apart on a platform 30 which may be of any suitable kind. The shaft 20 extends through journals located centrally of each of the ends of the legs 18, 24, and 26. The shaft 20 will be rotated preferably by a DC motor 32 which provides power through a clutch brake box 34 and a clutch mechanism, if desired, as represented at 34.

On the shaft 20, a plurality of discs are provided such as at 22 and 23 with the discs 16 and 22 closely positioned to one another. Discs 16 and 23 are fixed on shaft 20 so as to rotatable with shaft 20. Disc 22 is also relatively rotatable with respect to discs 16 and 23 and shiftable on shaft 20 with respect to the shaft 20 as described in detail below.

Referring now to FIG. 1, each of the discs 16, 22, and 23 are provided, on the outer peripheral edges, with recesses or openings such as at 40 for disc 16, 42 for disc 22 and 92 for disc 23. At 180° apart, similarly shaped recesses are provided on each disc one of which for disc 16 is indicated at 43 in FIG. 1. Since disc 22 is resiliently mounted on shaft 20 so as to be shiftable in an angular direction about the shaft, the recesses 40 and 42 provided, at opposite diameters, will serve to lock and hold an article deposited in each recess of each disc in the recesses of the three discs.

To effect locking of an article 14 once it is deposited in a recess, the facing surfaces of each of the discs 16 and 22 are provided with camming pins 44 and 46, as shown in FIGS. 1 and 2. Mounted on the platform 47 in a support arm 48 is an air cylinder 50 having a piston (not shown) and piston rod 52. A camming member 54 is mounted on the end of the piston rod 52 and is provided with a sloping surface 56 and a flat surface 58 positioned to engage the camming pins 44 and 46 and drive them apart against the action of a spring which will be carried in the hub of the disc 22. The piston is normally in an unactuated position corresponding to the disc 22 being in a locking position relative to discs 16 and 23. In operation, the actuation of the cylinder 50 is commenced by opening of an air valve 60 on the motor casing 64 (FIG. 2). This will be done in timed sequence with the rotation of the shaft 20 so that a recess 40 or 43 for disc 16 and the corresponding aligned recesses of the other two discs will be located adjacent the exit end 13 of the supply tray 12. The size of the recesses provided in the disc 16 and 22 is such that only one part at a time may be received in a recess.

As shown in FIG. 1, the shape of the side walls of the recesses in the peripheral edge of the discs 16, 22, and 23 as supplied, may be curved to accommodate the curved nature of a body such as the pipe nipples 14. This will assure steady positioning of the pipe nipple in the recesses when the locking is achieved by relative rotation of the locking disc 22 relative to the other discs 16, 23. Thus, one of the principal difficulties in labeling a small cylindrical object is solved by the present invention.

In operation, the feed tray 12 will be provided with a plurality of objects such as the cylindrical pipe nipples 14 which will be fed by gravity with the first pipe nipple resting upon the outer edge of the discs 16, 22 and 23. If the pipe nipples are of sufficient length, their stability is assured against rotation or twisting as they move down out of the tray 12 by contact with the outer periphery of the adjustable support disc 23. To accommodate different object lengths, the support disc 23 can be shifted on the shaft 20 by loosening of a set screw in the hub 27 of the disc 23.

A logic control is housed in the apparatus such as at 64. An object sensor 78 will be located to detect the presence of a body at the outlet end 13 of the tray 12 and will send a signal to the clutch mechanism which may be of the magnetic type and controlled by a logic controller. The motor 32 will normally be continuously running. Actuation of the clutch commence rotation of the shaft 20 and the associated discs 16, 22, 23. Rotation to bring a recess 40 into juxtaposition with the end 13 of the tray 12 will effect delivery of a single body 14 into the recesses 16 and 23 which are always substantially alligned. Prior to receiving the body 14, air cylinder 50 will have been actuated by the logic controller operating an air valve 60 to move the camming member 54 so as to shift disc 22 relative to disc 16 before shaft 20 is further rotated. This is done by engaging the camming pins 42 and 44 which effects the relative rotation to allow the smooth feeding of a body 14 into the recesses 40, 42 and 92 provided on the discs 16, 22 and 23. Immediately thereafter, the cylinder 50 is actuated again to retract the camming member 54 to allow a spring mounted in the hub, for example, of disc 16 to effect counter rotation of the disc 22 which will result in secure locking and holding of the body 14 in the respective recesses. The logic controller then actuates the brake/clutch mechanism 34 to rotate the shaft through 1800 while the body 14 is locked in the recesses 40, 42 and 92 of the respective discs. As the body 14 is rotated through the 180° angle, a dispensing mechanism generally designated at 80 will be operated by the logical controller to provide a tag such as a label 82 to an application station defined by the wrapping fingers 74 and 76, which serve as portions engaging the body surface. The tag or label 82 will be of the type where the exposed upper surface is coated with a contact adhesive of conventional make up. The obverse surface (downwardly facing as viewed in FIG. 1) may be printed with any desired indicia. The labels may be carried on a support material 84 from a roll supply (not shown). An air nozzle 86 may be intermittently actuated to assure accurate feeding of the label 82 to the wrapping fingers 74 and 76 as the conveying mechanism of the dispensing device 80 intermittently supplies the individual labels 82 to the application station the dispensing device including a separator device 81 for removing a label 82 from the support material 84. It has been found useful in terms of accurate location of the tags 82 that the width of the tags be slightly less than the perpendicular distance between the opposing faces of the discs 16 and 22. Also, in some types of dispensing apparatus, a cutter may be employed between the outer periphery of the discs 16 and 22 and the discharge point of the dispensing mechanism 80. In another alternative, the tags may be connected one to another by a weakened severing line such as a perforation so that the act of wrapping above a body 14 will effect severance of a tag as it is being applied from a subsequent tag coming from the dispensing device 80. Other alternatives will be apparent to those skilled in this art.

Figure 3:
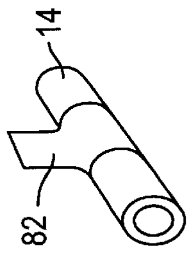
FIG. 3 is a prospective view of one embodiment of an article tagged in accordance with the present invention.

With a tag 82 disposed to extend over the upper edges 88 and 90 of horizontally extending leg and a depending leg of the wrapping fingers 70 and 72, the tag 82 will be positioned to contact an exterior surface of a body 14 as it is moved by the discs 16, 22 and 23 downwardly past the tips 74 and 76 of the wrapping fingers 70 and 72. As a consequence, the adhesive tag will be securely and firmly wrapped by being forced into intimate contact with the exterior surface of the body 14 to assume a wrapped condition as illustrated at 82 in FIG. 3. To assist and assure accurate wrapping, the wrapping fingers 70 and 72 may be spring loaded at their base by means of a spring by providing a spring mechanism in a base housing 91 and this may be adjustable to vary the spring load on the arms 70 and 72 to accommodate, for example, different types of labels, the stiffness of which may vary. The fingers 70 and 74 are each pivotal on pivot pins one of which is shown at 73 for finger 72.

To complete the operation, when the piston 50 is actuated to shift disc 22 so that a cylindrical body 14 will be received in the unlocked recess 40, recess 42 will be open to release a wrapped part 14 which will then fall into a conveyor tray 94 to be carried to another work station or to packaging or the like.

Having described the invention, it will be apparent to those skilled in the art that various modifications may be made therein without departing from the spirit and scope of the invention as defined in the appended claims.

What is claimed is:

1. A method of applying a tag to an article using a transport device of a type that receives, holds and moves the article between two positions with the first position being a receiving position and the second position being a discharge position and including three discs each mounted on a common shaft and being rotatable with said shaft and with one of said discs being movable relative to the other two discs, each disc having at least one recess with said recesses of said three discs being in substantial alignment including the steps of engaging an article at the receiving position by receiving the article in recesses of said discs, moving the article from the receiving position toward the discharge position and intercepting the article with a tag at an intermediate position between said first and second positions and releasing the article at the discharge station by moving said one disc of said three discs to enlarge a recess to allow the article therein to move out of the recess at the discharge position.

2. The method as claimed in claim 1 including the step of using a flexible tag having a surface at least partially coated with a contact adhesive.

3. The method as claimed in claim 1 including the step of using at least one flexible wrapping finger to assist in wrapping the tag about a portion of the article during the movement of the article from the first to the second position.

4. An apparatus for attaching a tag to a body having a longitudinal axis and longitudinal dimension greater than its width, comprising a transport device for moving the body from a supply to a tag applying station and from said tag applying station to a discharge station, a tag supply source, a dispensing device for presenting a tag to the tag applying station in a position such that as said transport device moves the body from the supply to said tag applying station, the body will engage the tag, a tag wrap device located subsequent, in the travel of the body, to the tag applying station, said tag wrap device including at least one member for engaging the tag and wrapping the tag about the body as said transport device moves the body from the tag applying station to the discharge station, said one member of said tag wrap device comprising a flexible arm positioned so that a portion of said arm engages the surface of the body, said tag wrap device including another flexible arm, said arms having tag engaging ends positioned to engage the tag subsequent to said tag applying station and wrap the tag about the surface of the body, each tag engaging end of each said flexible arm having, in use, a horizontally extending leg and a depending leg that extends at an angle downwardly from said horizontally extending leg with said depending legs of said arms being in yieldable contact.

5. An apparatus for attaching a tag to a body having a longitudinal axis and longitudinal dimension greater than its width, comprising a transport device for moving the body from a supply to a tag applying station and from said tag applying station to a discharge station, a tag supply source, a dispensing device for presenting a tag to the tag applying station in a position such that as said transport device moves the body from the supply to said tag applying station, the body will engage the tag, a tag wrap device located subsequent, in the travel of the body, to the tag applying station, said tag wrap device including at least one member for engaging the tag and wrapping the tag about the body as said transport device moves the body from the tag applying station to the discharge station, said transport device comprising a first disc mounted on a rotatable shaft and a second disc mounted on said shaft, each disc having an outer peripheral edge, each of said discs having recesses spaced about said outer edge for receiving and carrying a body therein, said discs being relatively rotatable so that the recesses of one of said discs are movable into a locking position with respect to a body and the recesses of said other disc and a releasing position, said shaft having a third disc having a peripheral edge and recesses formed in said peripheral edge, said recesses of said first and third discs being aligned and said first and third discs being fixed on said shaft so as to be rotatable therewith, said second disc being positioned on said shaft with at least one of said recesses thereof out of alignment with at least one of said recesses of said first and third discs, said second disc being rotatable on said shaft to move said at least one of said recesses thereof into alignment with said at least one of said recesses of said first and third discs when said at least one of said recesses is adjacent said supply station for the body.

6. The invention as claimed in claim 1 wherein the tag is of the type having oppositely facing surfaces with one of said surfaces including an adhesive material thereon of the type that adheres on contact with an object.

7. The invention as claimed in claim 2 wherein said dispensing device is provided with a supply conveyor device including a feed device positioned to feed a series of tags each mounted on a backing material from which each tag is removable, said dispensing device including a separator device for removing a tag adjacent said feed device from said backing material and presenting said removed tag to said tag applying station.

8. The invention as claimed in claim 7 wherein said feed tray has a feed surface extending toward said discs and said at least one member, said dispensing device including a fluid dispenser located adjacent said feed surface to supply a fluid under pressure so as to maintain a tag generally parallel to said feed surface upon being fed beyond said feed surface.

9. The invention as claimed in claim 1 wherein at least one other recess is provided respectively on said first and second discs with said one other recess of said second disc being located on said edge of said second disc so that when said recesses are adjacent said discharge station, said one other of said recesses will be in alignment when said second disc is moved relative to said shaft.

10. The invention as claimed in claim 9 wherein spring means are provided to constantly urge said second disc into a rotational position such that said recesses of said first and second discs are out of alignment.

11. The invention as claimed in claim 10 wherein said second disc includes a cam pin and said apparatus includes a camming member for periodically engaging said cam pin to move said second disc against said spring means to move said second disc relative to said shaft.

12. The invention as claimed in claim 1 wherein said one member of said tag wrap device comprises a flexible arm positioned so that a portion of said arm engages the surface of the body.

13. The invention as claimed in claim 12 wherein said tag wrap device includes another flexible arm, said arms having tag engaging ends positioned to engage the tag subsequent to said tag applying station and wrap the tag about the surface of the body.

14. The invention as claimed in claim 1 wherein the body is a pipe of cylindrical cross section and said supply is a sloping tray.

15. The invention as claimed in claim 14 wherein said sloping tray has a feed end located contiguous to said discs so that a pipe will be fed by gravity to a recess presented to said feed end.

16. The invention as claimed in claim 14 wherein said feed end of said supply includes a pipe sensor for sensing the presence of a pipe at said feed end, said apparatus including a motor device for rotating said shaft, said motor device being activated when said sensor detects a pipe.

* * * * *